United States Patent
Ma

(10) Patent No.: US 9,426,735 B2
(45) Date of Patent: Aug. 23, 2016

(54) METHOD FOR SETTING DISCONTINUOUS RECEPTION PERIOD AND MOBILE TERMINAL

(71) Applicant: Huawei Technologies Co., Ltd., Shenzhen (CN)

(72) Inventor: Tao Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 13/934,827

(22) Filed: Jul. 3, 2013

(65) Prior Publication Data

US 2014/0010132 A1 Jan. 9, 2014

(30) Foreign Application Priority Data

Jul. 5, 2012 (CN) .......................... 2012 1 0231740

(51) Int. Cl.
*H04W 52/00* (2009.01)
*H04W 52/02* (2009.01)

(52) U.S. Cl.
CPC ...... *H04W 52/0209* (2013.01); *H04W 52/0216* (2013.01); *Y02B 60/50* (2013.01)

(58) Field of Classification Search
CPC .............. H04W 52/0209; H04W 52/0216; H04W 52/03; H04W 4/20; H04W 24/02; H04W 44/16; Y02B 60/50
USPC ......... 370/230, 252, 311, 328–329, 331, 336, 370/338, 352; 455/423, 434, 436, 444, 456, 455/515, 574
See application file for complete search history.

(56) References Cited

U.S. PATENT DOCUMENTS

| | | | | |
|---|---|---|---|---|
| 8,447,369 B2 * | 5/2013 | Suzuki | ................ | H04W 76/048 370/310 |
| 8,688,119 B2 * | 4/2014 | Sagfors | ................. | H04W 36/36 370/331 |
| 2002/0064140 A1 * | 5/2002 | Numminen | ......... | H04W 76/048 370/311 |
| 2007/0291673 A1 * | 12/2007 | Demirhan | ......... | H04W 52/0216 370/311 |
| 2010/0034145 A1 * | 2/2010 | Kim | ................... | H04W 52/0216 370/328 |
| 2010/0130237 A1 | 5/2010 | Kitazoe et al. | | |
| 2012/0157153 A1 * | 6/2012 | Song | ................. | H04W 52/0245 455/522 |
| 2012/0195240 A1 | 8/2012 | Kim et al. | | |
| 2013/0121220 A1 * | 5/2013 | Virtej | .................. | H04W 76/048 370/311 |
| 2013/0227576 A1 | 8/2013 | Liu | | |

FOREIGN PATENT DOCUMENTS

| | | | |
|---|---|---|---|
| CN | 1980452 A | 6/2007 | |
| CN | 101421997 A | 4/2009 | |
| CN | 102217408 A | 10/2011 | |
| CN | 102547943 A | 7/2012 | |
| EP | 1499144 A1 * | 1/2005 | ............... H04Q 7/32 |
| EP | 2355612 A1 | 8/2011 | |
| JP | EP 1499144 A1 * | 1/2005 | ............... H04Q 7/32 |

* cited by examiner

*Primary Examiner* — Mohamed Kamara
(74) *Attorney, Agent, or Firm* — Brinks Gilson & Lione

(57) ABSTRACT

Embodiments of the present invention provide a method for setting a discontinuous reception period and a mobile terminal, which belong to the field of communications technologies, so as to save power of a battery of a mobile terminal device and prolong standby time. The method includes: determining a working state of a mobile terminal in a current network, where the working state refers to a network state when the mobile terminal works and the working state includes a stable state, a hold state, and an unstable state; and if the mobile terminal is in a stable state, adjusting a discontinuous reception DRX period of the mobile terminal from a current period T0 to a first period T1, where T1=K*T0, and K>1. The embodiments of the present invention are applied to radio communications.

8 Claims, 2 Drawing Sheets

METHOD FOR SETTING DISCONTINUOUS RECEPTION PERIOD AND MOBILE TERMINAL

CROSS-REFERENCE TO RELATED APPLICATION

This application claims priority to Chinese Patent Application No. 201210231740.7, filed on Jul. 5, 2012, which is hereby incorporated by reference in its entirety.

TECHNICAL FIELD

The present invention relates to the field of communications technologies, and in particular, to a method for setting a discontinuous reception period and a mobile terminal.

BACKGROUND

In order to reduce power consumption of a terminal and prolong standby time of a terminal battery, discontinuous reception (DRX, Discontinuous Reception) is introduced in communication. As shown in FIG. 1, a DRX cycle length refers to a time length from a wake-up time to a next wake-up time. One DRX cycle length includes a wake-up period and a sleep period. In a wake-up period, a terminal is woken up to receive a paging message and execute measurement. The reception of a paging message is mainly to monitor, in real time, whether a network side pages a current terminal; and the execution of measurement is to select, in real time, according to system messages of a current cell and a neighboring cell, a most suitable cell to camp on, so as to make the terminal in a better network state. A paging process is generally initiated by a CN (Core Network, core network). The terminal wakes up every DRX period to read a paging instruction channel and determines whether the terminal is paged or actively initiates a service. When being paged, the terminal initiates a service. If the terminal is neither paged nor actively initiates a service, the terminal enters a sleep period to reduce power consumption.

In an existing communication network system, a DRX cycle length between a terminal and the same base station, which is agreed by the terminal and a network, is fixed. A CN controls the number of times of a paging operation and the base station initiates a paging operation every DRX period. Each time a paging operation arrives, a terminal device wakes up to complete a monitoring task and a measurement task, namely, enters a wake-up period.

In the foregoing process, a condition of a network where a mobile terminal camps and a moving state of the terminal are not considered. Each time a paging period arrives, the mobile terminal enters a wake-up period, which causes a problem that power consumption of the terminal is high.

SUMMARY

Embodiments of the present invention provide a method for setting a discontinuous reception period and a mobile terminal, so as to save power of a mobile terminal battery and prolong standby time.

To achieve the foregoing objectives, the embodiments of the present invention adopt the following technical solutions.

In one aspect, a method for setting a discontinuous reception period is provided and includes:

determining a working state of a mobile terminal in a current network, where the working state refers to a network state when the mobile terminal works, and the working state includes a stable state, a hold state, and an unstable state; and if the mobile terminal is in a stable state, adjusting a discontinuous reception DRX period of the mobile terminal from a current period T0 to a first period T1, where $T1=K*T0$, and $K>1$.

In another aspect, a mobile terminal is provided and includes:

a determining module, configured to determine a working state of a mobile terminal in a current network, where the working state refers to a network state when the mobile terminal works, and the working state includes a stable state, a hold state, and an unstable state; and a first adjusting module, configured to, if the mobile terminal is in a stable state, adjust a discontinuous reception DRX period of the mobile terminal from a current period T0 to a first period T1, where $T1=K*T0$, and $K>1$.

With the method for setting a discontinuous reception period and the mobile terminal provided in the embodiments of the present invention, by determining a working state of a mobile terminal in a current network, when it is determined that the mobile terminal is in a stable state, a DRX period of the mobile terminal is increased, so that the number of times that the mobile terminal is woken up is decreased, thereby decreasing an integral current in the DRX period and prolonging standby time.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions in the present invention may be applied in various communication systems, such as a global system for mobile communication (Global System for Mobile Communication, GSM), a code division multiple access (CDMA, Code Division Multiple Access) system, a wideband code division multiple access wireless (WCDMA, Wideband Code Division Multiple Access Wireless) system, a general packet radio service (GPRS, General Packet Radio Service) system, and a long term evolution (LTE, Long Term Evolution) system.

In the embodiments of the present invention, a mobile terminal refers to any radio or mobile device connected to a network (such as a mobile phone, a mobile wideband, and a fixed station). The network refers to one or more devices on a server side (which is relative to a client side represented by a UE), such a device may include a base station, an RNC (radio network controller), a CN (core network), a mobile management entity (MME) or an equivalent, and other management and connection devices. The base station may be a base transceiver station (BTS, Base Transceiver Station) in a GSM or CDMA, may also be a NodeB (NodeB) in WCDMA, and may also be an evolved Node B (eNB or e-NodeB, evolved Node B) in LTE, which is not limited in the present invention.

The descriptions of the embodiments of the present invention mainly focus on a mobile terminal and interaction of the mobile terminal with a base station and an RNC and a CN (generally referred to as a network). A discontinuous reception (DRX, Discontinuous Reception) cycle length refers to a time length from one wake-up time to a next wake-up time of a mobile terminal. One DRX cycle length includes a wake-up period and a sleep period. A DRX period refers to the time that a mobile terminal is in a sleep period. A starting time of each wake-up period is referred to as a DRX wake-up time.

Figure 2:
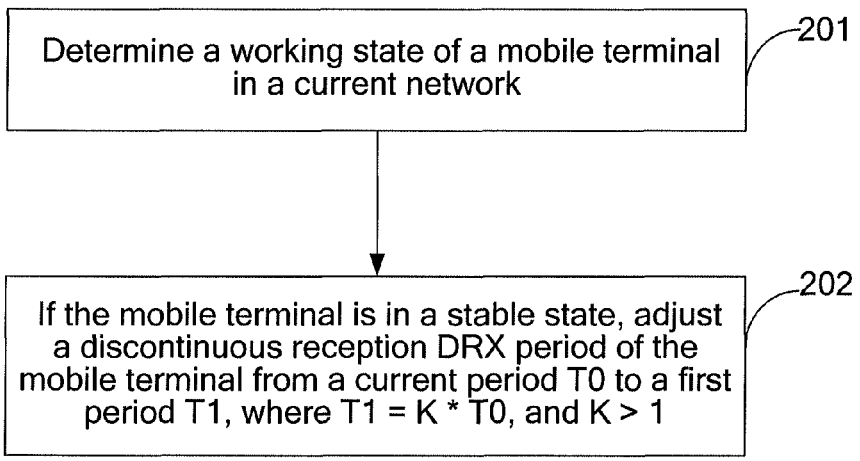
FIG. 2 is a flow chart of a method for setting a discontinuous reception period according to an embodiment of the present invention.

A method for setting a discontinuous reception period provided in an embodiment of the present invention, as shown in FIG. 2, includes:

201: Determine a working state of a mobile terminal in a current network.

The working state refers to a network state when a mobile terminal works, and the working state includes a stable state, a hold state, and an unstable state.

It should be noted that, in this embodiment, if the mobile terminal camps on a stable cell and the mobile terminal is in a static state, it is considered that the mobile terminal is in a stable state; if the mobile terminal is in a high-speed motion state, or the usage amount of mobile terminal users in a communication cell where the mobile terminal camps exceeds the allowable amount for normal communication in the cell (namely, exceeds a load of the cell), or the mobile terminal is at the edge of a current communication cell and may execute a switching command, it is considered that the mobile terminal is in an unstable state; and otherwise, it is considered that the mobile terminal is in a hold state, for example, the mobile terminal in a hold state may camps on a stable cell and is in a low-speed motion state. Persons of skill in the art should know that, the foregoing three working states of a mobile terminal are based on a signal fluctuation situation of the mobile terminal, namely, the signal quality of the mobile terminal.

Specifically, a working state of a mobile terminal in a current network may be determined through a network parameter. For example, the network parameter may be an absolute value of a difference between offsets of two adjacent DRX wake-up time frame header positions relative to a search window center. An offset of a previous DRX wake-up time frame header position relative to the search window center is marked as TA, an offset of a current DRX wake-up time frame header position relative to the search window center is marked as TB, and a difference of recent two times of DRX wake-up, Delta T=|TA−TB|, if it may be found, through search, that N1 adjacent DeltaTs<TM1, it is a stable state; if it may be found, through search, that N2 Delta Ts>TM2, it is an unstable state; and otherwise, it is a hold state. TM1 is a stable threshold that is determined according to experience, TM2 is an unstable threshold that is determined according to experience, and TM1<TM.

202: If the mobile terminal is in a stable state, adjust a discontinuous reception DRX period of the mobile terminal from a current period T0 to a first period T1, where T1=K*T0, and K>1.

The current period T0, according to a specific adjustment situation of the DRX period of the mobile terminal, may be an initial period that is set according to a DRX period parameter set at a network side (at this time, the DRX period of the mobile terminal is not adjusted), and may also be a DRX period that is obtained after adjustment is performed once or several times through steps 201 and 202.

Preferably, K is a positive integer, and T1 is an integral multiple of T0. Therefore, after the mobile terminal adjusts the DRX period, it may ensure that a time that the base station initiates a paging operation every DRX period T0 is consistent with a wake-up time of the mobile terminal, so that the mobile terminal successfully completes a monitoring task and a measurement task in a wake-up period.

With the method for setting a discontinuous reception period provided in this embodiment of the present invention, by determining a working state of a mobile terminal in a current network, and when it is determined that the mobile terminal is in a stable state, a DRX period of the mobile terminal is increased, so that the number of times that the mobile terminal is woken up is decreased, thereby decreasing an integral current in the DRX period and prolonging standby time.

Figure 3:
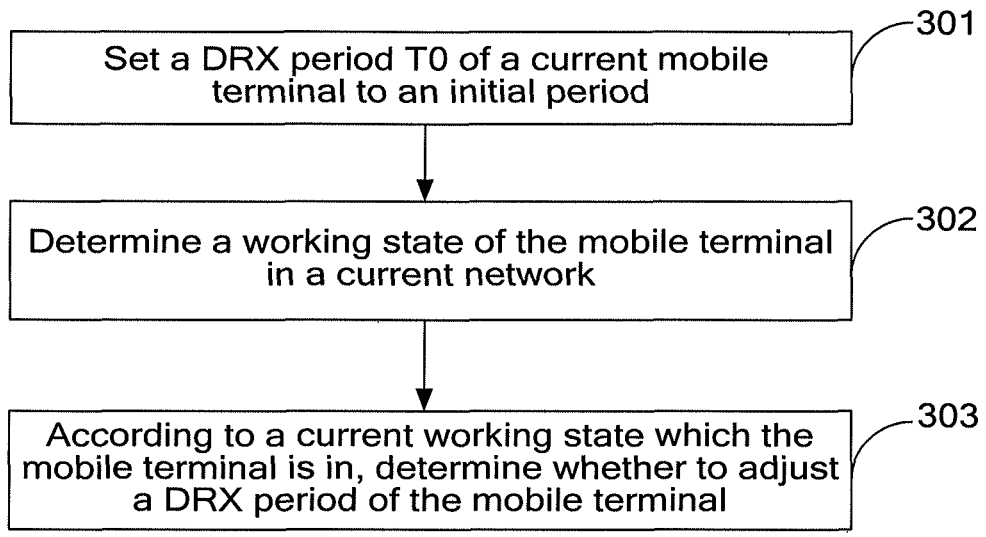
FIG. 3 is a flow chart of a method for setting a discontinuous reception period according to another embodiment of the present invention.

A method for setting a discontinuous reception period provided in another embodiment of the present invention, as shown in FIG. 3, includes:

301: Set a DRX period T0 of a current mobile terminal to an initial period.

The initial period is set according to a DRX period parameter set at a network side.

Exemplarily, by taking a WCDMA (Wideband Code Division Multiple Access, wideband code division multiple access) network as an example, in an idle mode, an initial DRX period T0 may be one of DRX period parameters {640 ms, 1280 ms, 2560 ms, and 5120 ms} set at the network side. In a continuous mode, the initial DRX period T0 may be one of the DRX period parameters {640 ms, 1280 ms, 2560 ms, and 5120 ms} set at the network side. The DRX period parameters set at the network side are generally notified to the mobile terminal through system message broadcast.

For different networks, such as a global system of mobile communication network (Global System of Mobile communication, GSM), a code division multiple access (CDMA, Code Division Multiple Access) network, a general packet radio service (GPRS, General Packet Radio Service) network, and a long term evolution (LTE, Long Term Evolution) network, DRX period parameters set at the network side may be different. Therefore, the initial DRX period T0 may also be different.

302: Determine a working state of the mobile terminal in a current network.

The working state refers to a network state when the mobile terminal works, and the working state includes a stable state, a hold state, and an unstable state.

Specifically, a working state of the mobile terminal in a current network may be determined through a network parameter. Optionally, the step may include:

3021: Obtain a network parameter of each DRX period.

Exemplarily, the network parameter is an absolute value of a difference between offsets of two adjacent DRX wake-up time frame header positions relative to a search window center. Through step 201, a current DRX period is an initial period T0. For an $i^{th}$ DRX period whose DRX period is T0, an offset Di of a DRX wake-up time frame header position relative to the search window center is saved, and a network parameter of the $i^{th}$ DRX period $\Delta Di=|Di-Di-1|$, where Di is the offset of the DRX wake-up time frame header position in the $i^{th}$ DRX period relative to the search window center, and Di-1 is an offset of a DRX wake-up time frame header position in an i-$1^{th}$ DRX period relative to the search window center.

Subsequently, the frame header position and the search window center position are adjusted to 0, namely, the frame header position is moved to the search window center position. A paging task and a measurement task in this DRX wake-up period are executed. After that, enter a current DRX sleep period.

3022: According to a range of a network parameter in each DRX period whose current DRX period length is T0, determine the working state of the mobile terminal in the current network.

Exemplarily, in the $i^{th}$ DRX period, a network parameter $\Delta Di$ in each DRX period whose current DRX period length is T0 is viewed, when it is found, through search, that continuous N1 network parameters $\Delta Di$ are smaller than a stable threshold TD1, it is determined that the mobile terminal is in a stable state, it indicates that the current mobile terminal works in a stable state such as a stable cell, a static state, or a low-speed motion state, and the network signal quality is stable. When it is found, through search, that continuous N2 network parameters $\Delta Di$ are greater than an unstable threshold TD2, it is determined that the mobile terminal is in an unstable state, it indicates that the current mobile terminal works in a high-speed motion state, or the usage amount of mobile terminal users in a communication cell where the mobile terminal camps exceeds a load of the cell, or the mobile terminal is in an unstable state, for example, at the edge of the current communication cell or is likely to execute a switching command, and the network signal quality is unstable. If a value of the network parameter frequently changes in a range that is smaller than TD1 and is greater than TD2, namely, if it is not found, through search, that the continuous N1 network parameters $\Delta Di$ are smaller than the stable threshold TD1, and it is not found, through search, that the continuous N2 network parameters $\Delta Di$ are greater than the unstable threshold TD2 either, it is determined that the mobile terminal is in a hold state. The stable threshold TD1 is smaller than the unstable threshold TD2; and TD1 and TD2 are set according to experience values.

303: According to a current working state which the mobile terminal is in, determine whether to adjust the DRX period of the mobile terminal.

If the mobile terminal is in a stable state, a discontinuous reception DRX period of the mobile terminal is adjusted from an initial period T0 to a first period T1, where T1=K*T0, K>1, and K is preferably a positive integer. If it is determined that the mobile terminal is in a hold state, the DRX period is held to be the initial period T0, so as to ensure that a network message is effectively received to guarantee normal communication.

Optionally, after the DRX period of the mobile terminal is adjusted to T1, a working state after the DRX period of the mobile terminal is adjusted to T1 may further be determined. A specific determining process is the same as that in step 302, which is not described herein again.

If the mobile terminal is in an unstable state, the DRX period of the mobile terminal is adjusted from T1 to T0, so as to ensure that a network message is effectively received to guarantee normal communication. If the mobile terminal is in a stable state, the DRX period of the mobile terminal is adjusted from T1 to a fourth period T4, so as to further reduce the number of times of DRX wake-up, where T4=N*T1, N>1, and N is preferably a positive integer. If the mobile terminal is in a hold state, the DRX period is held to be the first period T1.

Further, after the DRX period of the mobile terminal is adjusted to T4, a working state after the DRX period of the mobile terminal is adjusted to T4 may be determined. A specific determining process is the same as that in step 302, which is not described herein again.

If the mobile terminal is in an unstable state, the DRX period of the mobile terminal is adjusted from T4 to T3, where T3=T4/M, and M>1, so as to ensure that a network message is effectively received to guarantee normal communication. M is preferably a positive number that is divisible by T1, so that T3 is an integral multiple of a DRX period length set at a network side, or T3 is the same as the DRX period length set at the network side. If the mobile terminal is in a stable state, the DRX period of the mobile terminal is adjusted from T4 to T5, where T5=P*T1, P>1, and P is preferably a positive integer, so as to further reduce the number of times of DRX wake-up and save power of a battery of the mobile terminal.

It should be understood that, each time after the DRX period is adjusted, the working state after the DRX period is adjusted by the mobile terminal may be determined according to step 302. If the mobile terminal is in a stable state, a subsequent DRX period is adjusted to a longer period; and if the mobile terminal is in an unstable state, the subsequent DRX period is adjusted to a shorter period, and so on.

It should be noted that, the current period T0, according to a specific adjustment situation the DRX period of the mobile terminal in step 301, may also be a DRX period that is obtained after adjustment is performed once or several times through steps 301 to 303. When it is determined to prolong or shorten the DRX period of the mobile terminal, an adjusted DRX period should be an integral multiple of the DRX period length set at the network side, or the same as the DRX period length set at the network side, so as to ensure that a time that a base station initiates a paging operation is consistent with a wake-up time of the mobile terminal.

Figure 1:
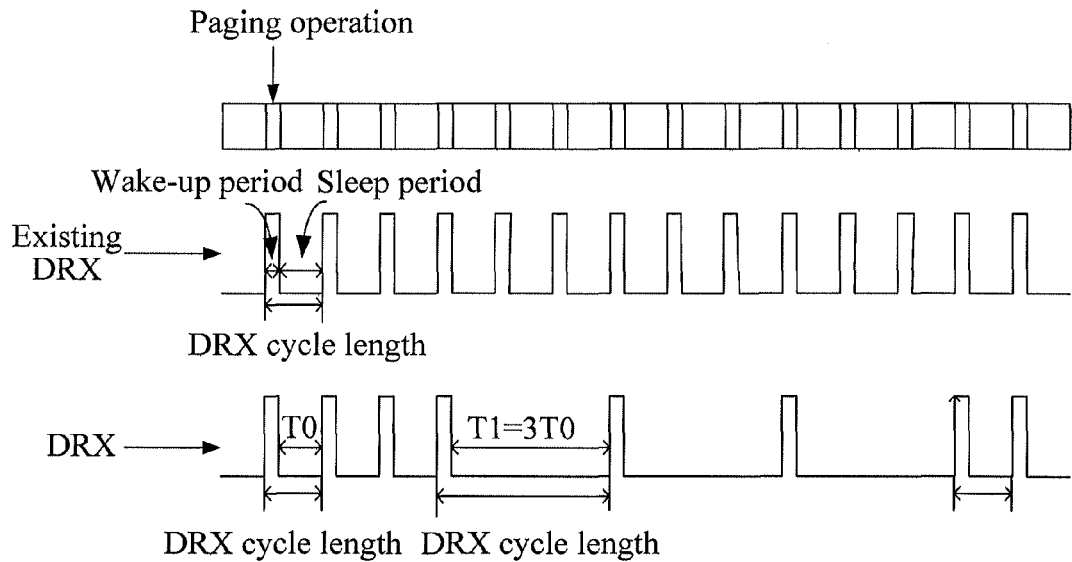
FIG. 1 is a schematic diagram of a comparison between processes of setting a DRX period of a terminal device in the prior art and in an embodiment of the present invention.

Referring to FIG. 1 in the following, a specific process of the method for setting a discontinuous reception period provided in this embodiment of the present invention is described.

Exemplarily, it is preset that when the DRX period of the mobile terminal is the initial period T0, and in continuous 2 DRX periods, a network parameter between adjacent DRX periods is smaller than a stable threshold, it is determined that the mobile terminal is in a stable state, and the DRX period is adjusted to the first period T1. When in the continuous 2 DRX periods, the network parameter between the adjacent DRX periods is greater than an unstable threshold, it is determined that the mobile terminal is in an unstable state, and the DRX period is adjusted to the initial period T0. Otherwise, it is determined that the mobile terminal is in a hold state, and the current DRX period is held. At this time, for the mobile terminal, N1 is equal to N2, both of which are 2.

As shown in FIG. 1, the mobile terminal is in a DRX period whose adjacent second and third periods are T0, network parameters $\Delta D2$ and $\Delta D3$ are both smaller than the stable threshold TD1, a subsequent DRX period is adjusted to the first period T1=3×T0 in a DRX period whose third period is T0. The mobile terminal is in the DRX period whose adjacent second and third periods are T1, the network parameters $\Delta D2$ and $\Delta D3$ are both greater than the unstable threshold TD2, and the subsequent DRX period is adjusted to T0 in the DRX period whose third period is T1.

Figure 4:
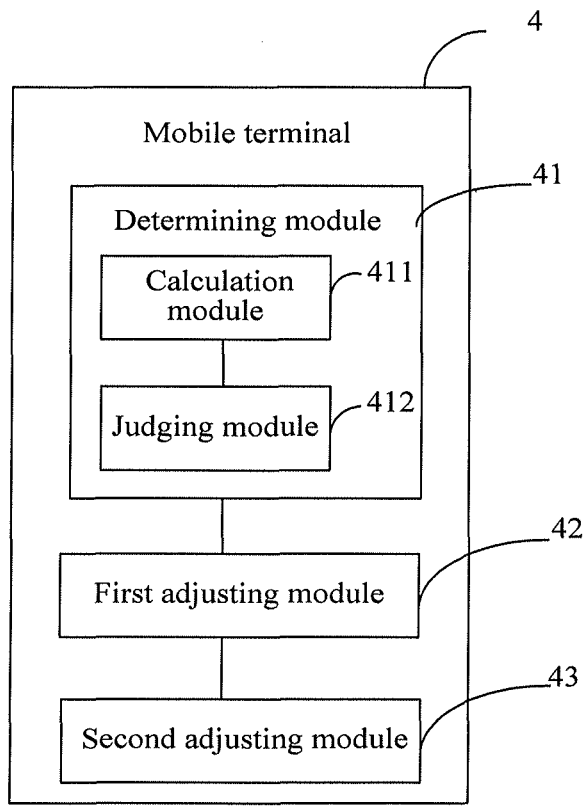
FIG. 4 is a schematic structural diagram of a mobile terminal according to an embodiment of the present invention.

An embodiment of the present invention further provides a mobile terminal. As shown in FIG. 4, the mobile terminal 4 includes:

a determining module 41, configured to determine a working state of a mobile terminal in a current network, where the working state refers to a network state when the mobile terminal works, and the working state includes a stable state, a hold state, and an unstable state; and a first adjusting module 42, configured to, if the mobile terminal is in a stable state, adjust a discontinuous reception DRX period of the mobile terminal from a current period T0 to a first period T1, where T1=K*T0, and K>1.

Further, the determining module 41 is further configured to determine a working state after the DRX period of the mobile terminal is adjusted, where the working state refers to a network state when the mobile terminal works, and includes a stable state, a hold state, and an unstable state.

The mobile terminal 4 further includes:

a second adjusting module 43, configured to, if the mobile terminal is in an unstable state, adjust the DRX period of the mobile terminal from T1 to T0.

Further, the determining module 41 includes:

a calculation module 411, configured to calculate a network parameter of two adjacent DRX periods; and a judging module 412, configured to, if in continuous N1 DRX periods, a network parameter between adjacent DRX periods or a mean value of network parameters is smaller than a stable threshold, determine that the mobile terminal is in a stable state; and if in continuous N2 DRX periods, a network parameter between adjacent DRX periods or a mean value of network parameters is greater than an unstable threshold, determine that the mobile terminal is in an unstable state. If it is determined that the mobile terminal is neither in a stable state nor in an unstable state, the mobile terminal is in a hold state. The stable threshold is smaller than the unstable threshold; and the mean value is an arithmetic mean value or a weighted mean value of the network parameters. The network parameter is a difference between offsets of two adjacent DRX wake-up time frame header positions relative to a search window center.

The mobile terminal in this embodiment of the present invention can execute the steps in the foregoing method embodiments, and complete functions of the method embodiments. In its application process, the method for setting a discontinuous reception period is implemented according to the description in the method embodiments.

Person of ordinary skill in the art may understand that all or part of the procedures of the methods in the embodiments may be implemented by a computer program instructing relevant hardware. The program may be stored in a computer readable storage medium, so that the CPU (processor) can read the program to implement the method described in the embodiments of present invention. When the program is run, the processes of the methods in the embodiments are performed. The storage medium may be a magnetic disk, an optical disk, a read-only memory (Read-Only Memory, ROM), a random access memory (Random Access Memory, RAM) or the like.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A method for setting a discontinuous reception period, comprising:

determining a working state of a mobile terminal in a current network through a network parameter, wherein the network parameter is a difference between offsets of two adjacent DRX wake-up time frame header positions relative to a search window center, and wherein the working state refers to a network state when the mobile terminal works, and comprises a stable state, a hold state, and an unstable state; and if the mobile terminal is in a stable state, adjusting a discontinuous reception DRX period of the mobile terminal from a current period T0 to a first period T1, wherein T1=K*T0, and K>1, wherein:

if the mobile terminal is in an unstable state, adjusting the DRX period of the mobile terminal from the current period T0 to a second period T2, wherein T2=T0/L, and L>1; and if the mobile terminal is in a hold state, holding the DRX period of the mobile terminal to be the current period T0.

2. The method according to claim 1, wherein after the step of adjusting a discontinuous reception DRX period of the mobile terminal from a current period T0 to a first period T1, the method further comprises:

determining a working state after the DRX period of the mobile terminal is adjusted; and if the mobile terminal is in an unstable state, adjusting the DRX period of the mobile terminal from T1 to a third period T3, wherein T3=T1/M, and M>1.

3. The method according to claim 2, further comprising:

if the mobile terminal is in a stable state, adjusting the DRX period of the mobile terminal from T1 to a fourth period T4, wherein T4=N*T1, and N>1; and if the mobile terminal is in a hold state, holding the DRX period of the mobile terminal to be T1.

4. The method according to claim 1, wherein the determining a working state of a mobile terminal in a current network comprises:

if in continuous N1 DRX periods, wherein N1 is an integer >1, and a network parameter between adjacent DRX periods or a mean value of network parameters is smaller than a stable threshold, determining that the mobile terminal is in a stable state;

if in continuous N2 DRX periods, wherein N2 is an integer >1, and a network parameter between adjacent DRX periods or a mean value of network parameters is greater than an unstable threshold, determining that the mobile terminal is in an unstable state; wherein if it is determined that the mobile terminal is neither in a stable state nor in an unstable state, the mobile terminal is in a hold state, wherein the stable threshold is smaller than the unstable threshold; and the mean value is an arithmetic mean value or a weighted mean value of the network parameters.

5. The method according to claim 2, wherein the determining a working state after the DRX period of the mobile terminal is adjusted comprises:

if in continuous N1 DRX periods, wherein N1 is an integer >1, and a network parameter between adjacent DRX periods or a mean value of network parameters is smaller than a stable threshold, determining that the mobile terminal is in a stable state;

if in continuous N2 DRX periods, wherein N2 is an integer >1, and a network parameter between adjacent DRX periods or a mean value of network parameters is greater than an unstable threshold, determining that the mobile terminal is in an unstable state; wherein if it is determined that the mobile terminal is neither in a stable state nor in an unstable state, the mobile terminal is in a hold state, wherein the stable threshold is smaller than the unstable threshold; and the mean value is an arithmetic mean value or a weighted mean value of the network parameters.

6. A mobile terminal, comprising at least a processor executing program codes stored in a memory, which configure the mobile terminal to:

determine a working state of a mobile terminal in a current network through a network parameter, wherein the network parameter is a difference between offsets of two adjacent DRX wake-up time frame header positions relative to a search window center, and wherein the working state refers to a network state when the mobile terminal works, and the working state comprises a stable state, a hold state, and an unstable state; and if the mobile terminal is in a stable state, adjust a discontinuous reception DRX period of the mobile terminal from a current period T0 to a first period T1, wherein T1=K*T0, and K>1, wherein:

if the mobile terminal is in an unstable state, adjusting the DRX period of the mobile terminal from the current period T0 to a second period T2, wherein T2=T0/L, and L>1; and if the mobile terminal is in a hold state, holding the DRX period of the mobile terminal to be the current period T0.

7. The mobile terminal according to claim 6, wherein the mobile terminal is further configured to:

calculate a network parameter of two adjacent DRX periods; and if in continuous N1 DRX periods, wherein N1 is an integer >1, and a network parameter between adjacent DRX periods or a mean value of network parameters is smaller than a stable threshold, determine that the mobile terminal is in a stable state; and if in continuous N2 DRX periods, wherein N2 is an integer >1, and a network parameter between adjacent DRX periods or a mean value of network parameters is greater than an unstable threshold, determine that the mobile terminal is in an unstable state; wherein if it is determined that the mobile terminal is neither in a stable state nor in an unstable state, the mobile terminal is in a hold state, wherein the stable threshold is smaller than the unstable threshold; and the mean value is an arithmetic mean value or a weighted mean value of the network parameters.

8. The mobile terminal according to claim 6, wherein the mobile terminal is further configured to:

calculate a network parameter of two adjacent DRX periods; and if in continuous N1 DRX periods, wherein N1 is an integer >1, and a network parameter between adjacent DRX periods or a mean value of network parameters is smaller than a stable threshold, determine that the mobile terminal is in a stable state; and if in continuous N2 DRX periods, wherein N2 is an integer >1, and a network parameter between adjacent DRX periods or a mean value of network parameters is greater than an unstable threshold, determine that the mobile terminal is in an unstable state; wherein if it is determined that the mobile terminal is neither in a stable state nor in an unstable state, the mobile terminal is in a hold state, wherein the stable threshold is smaller than the unstable threshold; and the mean value is an arithmetic mean value or a weighted mean value of the network parameters.

* * * * *